United States Patent [19]
Pope

[11] Patent Number: 4,900,203
[45] Date of Patent: Feb. 13, 1990

[54] LOAD-TIE-DOWN SYSTEM AND WINCH ASSEMBLY

[76] Inventor: Ronald W. Pope, 6287 Firwood Dr., West Linn, Oreg. 97068

[21] Appl. No.: 247,629

[22] Filed: Sep. 22, 1988

[51] Int. Cl.⁴ ............ B61D 45/00; A44B 11/25; B60R 9/00

[52] U.S. Cl. ................. 410/36; 24/68 CD; 100/212; 224/318; 410/100

[58] Field of Search .............. 410/50, 97–100, 410/103, 106, 110, 31, 32, 34, 36, 37, 42, 41, 155, 90; 248/74.3, 505, 503; 296/3; 211/60.1, 70.5, 182; 224/42, 39, 42.4, 42.46 R, 324, 917, 318; 24/68 CD, 71.2, 68 B; 254/213, 217, 218, DIG. 14; 100/212, 278, 279

[56] References Cited

U.S. PATENT DOCUMENTS

| | | |
|---|---|---|
| 2,048,374 | 7/1936 | Childress . |
| 2,146,104 | 2/1939 | Adamson . |
| 2,738,204 | 3/1956 | Ibey . |
| 3,428,331 | 2/1969 | Morgan et al. . |
| 3,697,045 | 10/1972 | Farley .................... 410/103 |
| 4,045,002 | 8/1977 | Miller . |
| 4,174,119 | 11/1979 | Biles .............. 24/68 CD X |
| 4,382,736 | 5/1983 | Thomas ............ 410/100 X |

FOREIGN PATENT DOCUMENTS 2038268 7/1980 United Kingdom ........... 410/103

Primary Examiner—Robert J. Oberleitner
Attorney, Agent, or Firm—Kolisch, Hartwell & Dickinson

[57] ABSTRACT

The load-tie-down system of the invention includes a load-supporting structure having a side support and a second support. A winch assembly is operably mounted on the load-supporting structure and includes a winch frame having a crosspiece and two struts projecting downward from the crosspiece. A winch drum is rotatably mounted between the two struts of the winch frame and a belt is attached at one end to and wound around the winch drum. A hook is attached to the free end of the belt. The belt is anchored by the hook attaching to an anchor located on the winch frame. The anchor includes a bar on the winch frame around which the hook may fasten. A lock to restrain the rotation of the winch drum is also included having a ratchet wheel attached to the winch drum and a pawl pivotally attached to the winch frame. The winch drum and anchor are located so that the belt may extend around the crosspiece and a load and then anchor on the winch frame.

9 Claims, 2 Drawing Sheets

LOAD-TIE-DOWN SYSTEM AND WINCH ASSEMBLY

BACKGROUND OF THE INVENTION

1. Field of the Invention

This invention relates to load-tie-down systems and winch assemblies. More particularly, this invention concerns winch assemblies used to provide a superior tie-down system for loads supported on a lattice-type rack.

2. Description of the Prior Art

Load-tie-down systems have generally consisted of a winch to which a belt is attached The free end of the belt is wrapped around a load and anchored to a position remote from the winch. The belt is then tightened to hold the load against a flat support surface, such as a truck bed or a railroad flat car.

Other load-tie-down assemblies consist of a cord attached to a jack. The cord is extended around a load and anchored to the jack mount The cord is tightened and the load secured by lowering the jack.

Unlike the prior art, this invention discloses a winch assembly used to secure a load against a load-supporting structure having side support means and second support means, such as a pickup truck rack. Additionally, this invention discloses a winch assembly wherein a belt is attached to the winch assembly and, after wrapping around a load, anchored to the same winch assembly.

An object of this invention is to provide a load-tie-down system wherein a load is secured on a load-supporting structure such as a rack using a winch assembly.

Another object of this invention is to provide a load-tie-down assembly using a winch, wherein a belt may wrap around a load and anchor on the winch assembly.

An additional object of this invention is to provide a winch assembly mounted on the outside of a support structure so that the space of the loading area is not reduced.

Still another object of this invention is to provide a winch assembly which is easy to stow and secure.

Another object of this invention is to provide a winch assembly and an associated anchor as a single device.

A further object of this invention is to provide an inexpensive and easy to use load-tie-down system and winch assembly.

SUMMARY OF THE INVENTION

The load-tie-down system of the invention comprises a load-supporting structure having a side support means and a second support means. A winch assembly is operably mounted on the load-supporting structure and is comprised of a winch frame having a crosspiece and two struts projecting downward from the crosspiece. A winch drum is rotatably mounted between the two struts of the winch frame and a belt is attached at one end to and wound around the winch drum. A hook is attached to the free end of the belt. The belt is anchored by the hook attaching to anchoring means located on the winch frame. The anchoring means comprises a receptor on the winch frame around which the hook may fasten. A locking means to restrain the rotation of the winch drum is also included and comprises a ratchet wheel attached to the winch drum and a pawl pivotally attached to the winch frame. The winch drum and anchoring means are located so that the belt may extend around the crosspiece and a load and then anchor on the winch frame.

DETAILED DESCRIPTION OF THE PREFERRED EMBODIMENT

Figure 1:
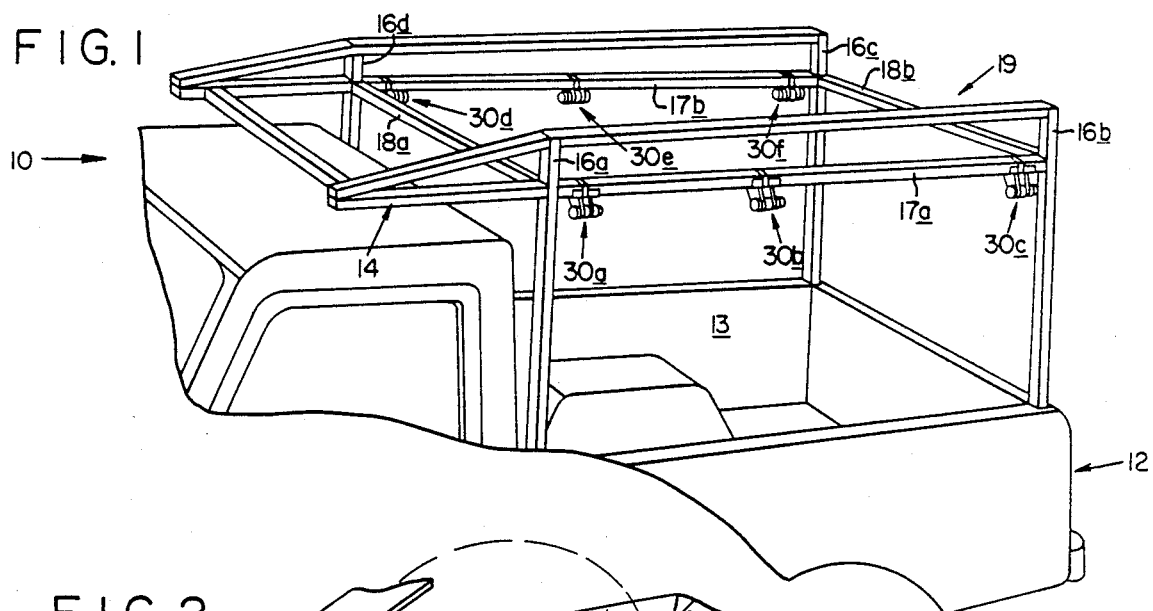
FIG. 1 shows a pickup truck with a preferred embodiment of the invention comprising a rack and winch assemblies mounted on the rack.

Referring to FIG. 1, a preferred embodiment of the load-tie-down system of the invention is shown generally at 10. Load-tie-down system 10 is mounted on pickup truck 12. Pickup truck 12 has a rectangular load bed 13.

Load-tie-down system 10 includes a load-supporting structure or rack 14. Rack 14 has four vertically-extending supports 16a–d. Vertically-extending supports 16a–d constitute what is referred to as side support means. Vertically-extending supports 16a–d are rigidly mounted to pickup truck 12, one support mounted to each corner of load bed 13.

Rack 14 also has two horizontally-extending supports 18a and 18b. Horizontally-extending supports 18a and 18b constitute what is referred to as second support means. Horizontally-extending support 18a is mounted to and extends between vertically-extending supports 16a and 16d. Horizontally-extending support 18b is mounted to and extends between vertically-extending supports 16b and 16c.

Vertically-extending supports 16a–d are also connected by braces 17a and 17b. Brace 17a is fastened to and extends between vertically-extending supports 16a and 16b. Brace 17b is fastened to and extends between vertically-extending supports 16c and 16d. Braces 17a and 17b have a rectangular shape.

The region between vertically-extending supports 16a–d and above horizontally-extending supports 18a and 18b constitutes load-supporting region 19. Load-supporting region 19 is open to accommodate loads of various sizes.

Load-tie-down system 10 also includes winch assemblies 30a–f. Winch assemblies 30a–c are spaced apart and operably attached to brace 17a of rack 14. Winch assemblies 30d–f are spaced apart and operably attached to brace 17b.

The construction of rack 14 allows a load such as pipe to be placed across horizontally-extending supports 18a and 18b. The load is then held in the corner against the vertically-extending supports and the horizontally-extending supports by winch assemblies 30a–f. Additionally, winch assemblies 30a–f are attached to rack 14 such that load-supporting region 19 is not obstructed. Rack 14 also has an open, lattice-type construction to accommodate various size loads.

Figure 2:
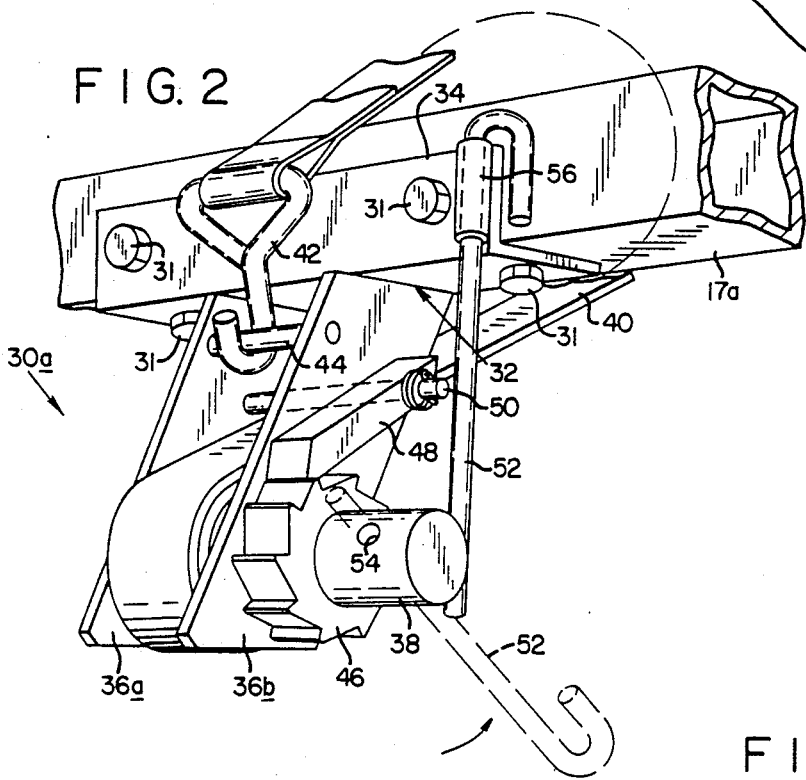
FIG. 2 is a perspective view of a winch assembly.

Turning now to FIG. 2, a perspective view of winch assembly 30a of the invention is shown. Winch assembly 30a is shown bolted to a portion of brace 17a by bolts 31.

Winch assembly 30a comprises a winch frame 32 having a right-angle crosspiece 34. Crosspiece 34 is bolted to brace 17a by bolts 31. Two struts, 36a and 36b, are welded to and project downward and outward from crosspiece 34. Struts 36a and 36b are planar and rigid and are spaced apart.

A winch drum 38 is rotatably mounted between and extends outward from struts 36a and 36b. A belt 40 has a hook 42 attached to its free end, and its other end attached to and wound around winch drum 38.

Locking means to restrain the rotation of winch drum 38 include a ratchet wheel 46 connected to winch drum 38 and a pawl 48 pivotally mounted to winch frame 32 by bar 50. Bar 50 is mounted between struts 36a and 36b, above winch drum 38 and below crosspiece 34.

Anchoring means comprising a receptor 44 is attached to winch frame 32 below crosspiece 34, above winch drum 38 and between struts 36a and 36b. Receptor 44 is positioned a predetermined distance from bar 50 so that to anchor hook 42 around receptor 44, hook 42 must be turned and slid between receptor 44 and bar 50. Thus, bar 50 restrains hook 42 from unhooking.

A lever bar 52 may be used to rotate winch drum 38 by inserting it in hole 54 and turning. When not in use, lever bar 52 is held in holder 56.

Winch assembly 30a is constructed so that belt 40 may extend around crosspiece 34, brace 17a and a load and then anchor on receptor 44. Belt 40 is then tightened, securing the load.

Figure 3:
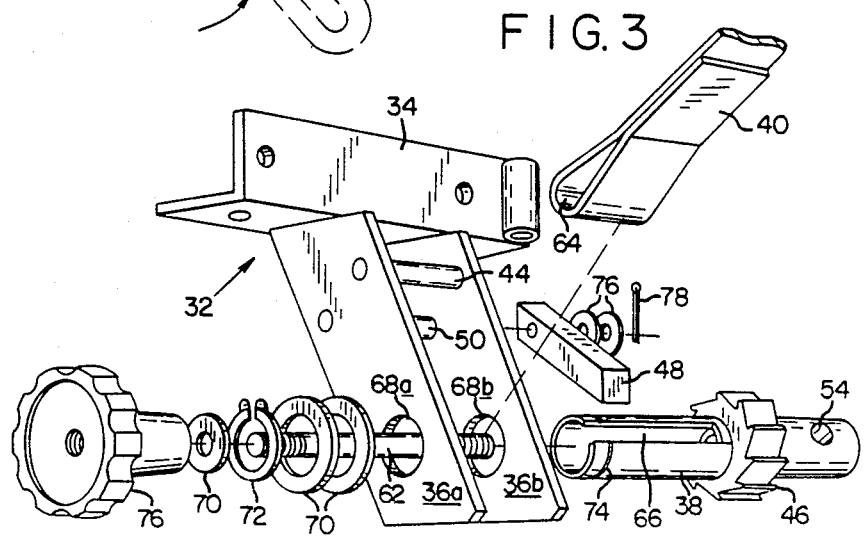
FIG. 3 is an exploded view of the winch assembly shown in FIG. 2.

In FIG. 3, and exploded view of winch assembly 30a is shown. Winch frame 32 is shown having crosspiece 34 and struts 36a and b. Winch drum 38 is shown with ratchet wheel 46 connected thereto. Belt 40 is connected to winch drum 38 by rod 62 extending through loop 64 of belt 40 and then connecting to winch drum 38. The belt extends from rod 62 through slot 66 in winch drum 38 and then wraps around winch drum 38. The edge of slot 66 which bears against the belt during tightening (facing the viewer in FIG. 3) is rounded.

Winch drum 38 and rod 62 extend through apertures 68a and 68b located in struts 36a and 36b, respectively. Thereby, winch drum 38 is rotatably mounted between struts 36a and 36b. Winch drum 38 and rod 62 are secured in place by washers 70, clip 72 which snaps into notch 74 on winch drum 38, and handle 76.

Pawl 48 is pivotally mounted to winch frame 32 by bar 50 extending between struts 36a and 36b. Pawl 48 is pivotally fastened to bar 50 by means of washers 76 and cotter pin 78.

Figure 4:
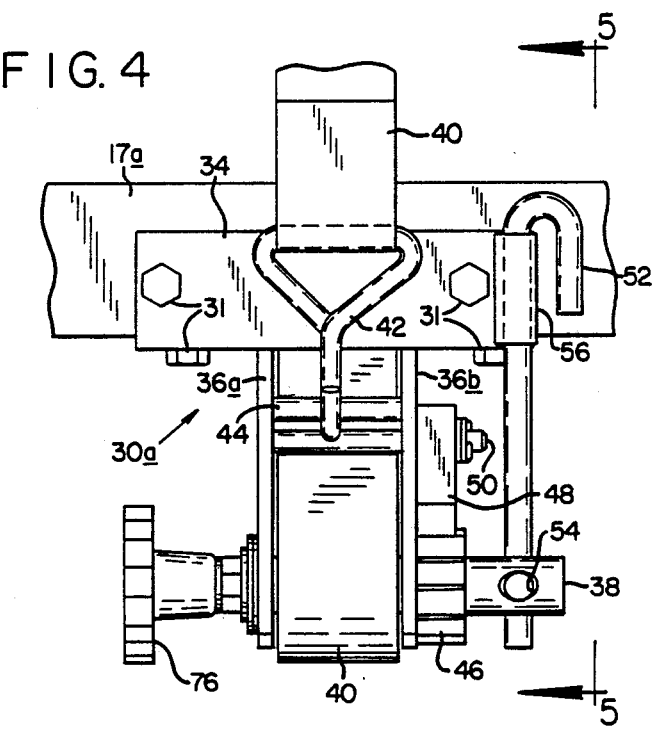
FIG. 4 is a frontal plan view of the winch assembly.

FIG. 4 shows a frontal plan view of winch assembly 30a. Winch assembly 30a is shown mounted to a portion of brace 17a.

Figure 5:
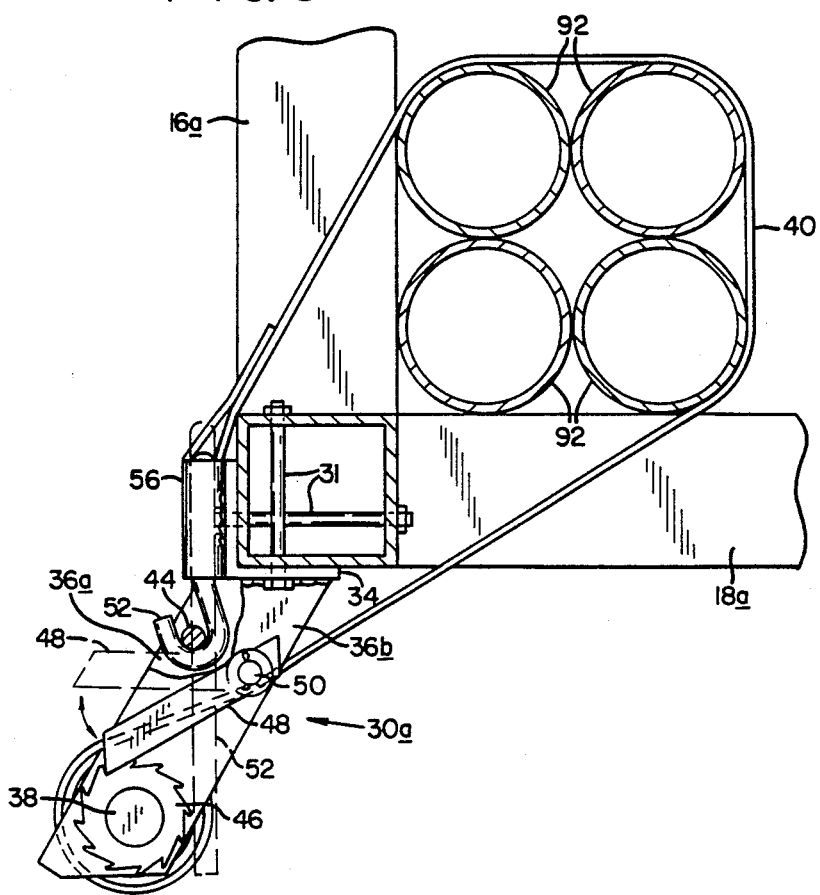
FIG. 5 is a cross-sectional view of the winch assembly taken along line 5—5 in FIG. 4.

FIG. 5 shows a cross-sectional view of winch assembly 30a taken along line 5—5 in FIG. 4. Vertically-extending support 16a and horizontally-extending support 18a cradle a load 92. Load 92 is held against vertically-extending support 16a and horizontally-extending support 18b by winch assembly 30a. Belt 40, wound around the winch drum 38, extends around load 92 and anchors at receptor 50 on winch assembly 30a. The open construction of rack 14 allows belt 40 to extend up and around loads of various sizes.

Operation

To operate the load-tie-down system, a load is placed in the load-supporting region. The pawl is disengaged from the ratchet wheel and the winch belt is extended up through the load supporting region and around the load. The open construction of the rack allows the belt to extend through the load-supporting region at various angles to accommodate various loads.

The belt is then anchored on the winch assembly and tightened. The belt is tightened by turning the winch drum. Tightening of the belt holds the load in the corner against the vertically-extending supports and the horizontally-extending supports.

To release the load, the pawl is disengaged from the ratchet wheel and the belt is loosened. The hook is then unfastened and the belt is removed from around the load.

To secure the winch assembly when not in use, the belt is extended around the brace to which it is mounted and anchored. The belt is then tightened.

While a preferred embodiment of the invention has been disclosed, it should be understood that certain variations and modifications may be made thereto without departing from the spirit of the invention.

It is claimed and desired to secure by Letters Patent:

1. A load-tie-down system comprising:
   a load-supporting structure constructed to cradle a load, including an upwardly extending side support means, a second support means connected to and extending transversely from the side support means, and a corner where the side support means and the second support means connect;
   a winch frame mounted on the load-supporting structure near the corner;
   a winch drum rotatably mounted on the winch frame;
   a belt having one free end and a second end attached to and wound around the winch drum;
   anchoring means, located on the winch frame, for fastening the free end of the belt to the winch frame after wrapping the belt around the load;
   locking means for restraining the rotation of the winch drum; and
   the winch drum and anchor means located on the winch frame in such a posiiton that the belt may extend around and secure the load by the belt pulling the load into the corner against the side support means and the second support means.

2. The load-tie-down system of claim 1 wherein the load-supporting structure comprises a lattice-type rack with the side support means comprising spaced, vertically-extending supports and the second support means comprising spaced, horizontally-extending supports.

3. The load-tie-down system of claim 1 wherein the winch frame comprises a horizontal crosspiece and two downwardly and outwardly-projecting struts mounted to the horizontal crosspiece, and the winch drum is rotatably mounted between the two struts.

4. The load-tie-down system of claim 1 wherein the locking means comprises a ratchet wheel connected to the winch drum and a pawl pivotally mounted to the winch frame.

5. The load-tie-down system of claim 1 wherein the system is incorporated on a vehicle and the winch frame is mounted to the load-supporting structure so that the winch drum is below the load supporting region and the winch drum extends outwardly from the vehicle.

6. The load-tie-down system of claim 1 wherein the load supporting structure is an open framework and constructed to allow the belt to extend in various directions up through and around the load-supporting region.

7. A load-tie-down system comprising:
   a load-supporting structure constructed to cradle a load, having a side support means, a second support means adjacent the side support means, and a load-supporting region defined by the side support means and the second support means;

a winch frame mounted on the load-supporting structure including a horizontal crosspiece and two downwardly and outwardly projecting struts mounted to the horizontal crosspiece;

a winch drum rotatably mounted on the winch frame between the two struts;

a belt having a hook attached to one free end and a second end attached to and wound around the winch drum;

anchoring means, located on the winch frame, for fastening the free end of the belt to the winch frame after wrapping the belt around the load including a bar mounted between the two struts of the winch frame around which the hook may fasten;

locking means for restraining the rotation of the winch drum; and the winch drum and anchor means located on the winch frame in such a position that the belt may extend around and secure the load by the belt holding the load against the side support means and the second support means.

8. A winch assembly comprising:

a winch frame having a crosspiece and two struts projecting downward from the crosspiece;

a winch drum rotatably mounted between the two struts of the winch frame;

a belt having a hook attached to one end and a second end attached to and wound around the winch drum;

anchoring means comprising a bar mounted between the two struts of the winch frame around which the hook may attach;

locking means to restrain the rotation of the winch drum; and the winch drum and anchoring means located so that the belt may extend around the crosspiece and then anchor on the winch frame.

9. A winch assembly comprising:

a winch frame having a crosspiece and two struts projecting away from the crosspiece;

a winch drum rotatably mounted between the two struts of the winch frame;

a strap having a free end and a second end attached to and wound around the winch drum;

anchoring means on the winch frame for allowing the free end of the belt to be secured; and locking means to restrain the rotation of the winch drum;

whereby the winch drum and anchoring means are located so that the strap may extend around the crosspiece and then anchor on the winch frame.

* * * * *